US009578496B2

(12) United States Patent
Xu et al.

(10) Patent No.: US 9,578,496 B2
(45) Date of Patent: Feb. 21, 2017

(54) METHOD AND USER EQUIPMENT FOR NEGOTIATING SECURITY DURING HANDOVER BETWEEN DIFFERENT RADIO ACCESS TECHNOLOGIES

(71) Applicant: Huawei Technologies Co., Ltd., Shenzhen, Guangdong (CN)

(72) Inventors: Xiaoying Xu, Shanghai (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/079,350

(22) Filed: Nov. 13, 2013

(65) Prior Publication Data
US 2014/0068709 A1  Mar. 6, 2014

Related U.S. Application Data

(63) Continuation of application No. 12/617,175, filed on Nov. 12, 2009, now Pat. No. 8,611,949, which is a
(Continued)

(30) Foreign Application Priority Data

May 15, 2007   (CN) .......................... 2007 1 0099176

(51) Int. Cl.
*H04M 3/42*     (2006.01)
*H04W 12/04*    (2009.01)
(Continued)

(52) U.S. Cl.
CPC ............ *H04W 12/04* (2013.01); *H04B 1/406* (2013.01); *H04L 9/14* (2013.01); *H04W 12/08* (2013.01);
(Continued)

(58) Field of Classification Search
CPC ...... H04W 88/06; H04W 48/18; H04B 1/406; H04L 63/164; H04L 63/068; H04L 43/028
(Continued)

(56) References Cited

U.S. PATENT DOCUMENTS 5,598,459 A    1/1997  Haartsen
6,370,380 B1   4/2002  Norefors et al.
(Continued)

FOREIGN PATENT DOCUMENTS

CN        1193449 A        9/1998
CN        1321049 A        11/2001
(Continued)

OTHER PUBLICATIONS

"3GPP TSG-SA2 Meeting #62—Selecting and signaling the security algorithms in handover from Rel-8 UTRAN to E-UTRAN," Change Request, S2-080939, 3$^{rd}$ Generation Partnership Project, Valbonne, France (Jan. 2007).
(Continued)

*Primary Examiner* — William D Cumming
(74) *Attorney, Agent, or Firm* — Leydig, Voit & Mayer, Ltd.

(57)   ABSTRACT

Solution for security negotiation during handover of a user equipment (UE) between different radio access technologies are provided. In the solution, the UE receives NAS security information and AS security information which are selected by the target system and then performs security negotiation with the target system according to the received NAS security information and AS security information. As such, the UE may obtain the key parameter information of the NAS and AS selected by a LTE system and perform security
(Continued)

negotiation with the LTE system when the UE hands over from a different system, such as a UTRAN, to the LTE system.

8 Claims, 6 Drawing Sheets

Related U.S. Application Data continuation of application No. PCT/CN2008/070962, filed on May 14, 2008.

(51) Int. Cl.
| | |
|---|---|
| *H04W 36/00* | (2009.01) |
| *H04B 1/403* | (2015.01) |
| *H04W 88/06* | (2009.01) |
| *H04W 12/08* | (2009.01) |
| *H04L 9/14* | (2006.01) |
| *H04W 36/08* | (2009.01) |
| *H04W 48/18* | (2009.01) |
| *H04W 88/08* | (2009.01) |

(52) U.S. Cl.
CPC ....... *H04W 36/0038* (2013.01); *H04W 36/08* (2013.01); *H04W 88/06* (2013.01); *H04L 2209/24* (2013.01); *H04W 48/18* (2013.01); *H04W 88/08* (2013.01)

(58) Field of Classification Search
USPC ............... 455/552.1, 411; 370/338, 328, 331
See application file for complete search history.

(56) References Cited

U.S. PATENT DOCUMENTS

| | | | |
|---|---|---|---|
| 6,587,680 B1 | 7/2003 | Ala-Laurila et al. | |
| 7,020,455 B2 | 3/2006 | Krishnarajah et al. | |
| 7,486,952 B1 | 2/2009 | Davies et al. | |
| 8,023,658 B2* | 9/2011 | Yang ..................... | H04L 63/068 380/278 |
| 8,144,877 B2* | 3/2012 | Yang ..................... | H04L 63/068 380/278 |
| 8,300,827 B2* | 10/2012 | Yang ..................... | H04L 63/068 380/277 |
| 8,611,949 B2* | 12/2013 | Xu et al. ..................... | 455/552.1 |
| 8,774,759 B2 | 7/2014 | He | |
| 9,031,240 B2* | 5/2015 | Yang ..................... | H04L 63/068 380/278 |
| 9,071,962 B2* | 6/2015 | Janakiraman ......... | H04L 43/028 |
| 9,167,486 B2* | 10/2015 | Bachmann ............ | H04L 63/164 |
| 2002/0066011 A1 | 5/2002 | Vialen et al. | |
| 2004/0162055 A1 | 8/2004 | Wu | |
| 2004/0228491 A1 | 11/2004 | Wu | |
| 2005/0030923 A1 | 2/2005 | Stuempert et al. | |
| 2005/0111666 A1 | 5/2005 | Blom et al. | |
| 2005/0177723 A1 | 8/2005 | Huang et al. | |
| 2006/0083201 A1 | 4/2006 | He et al. | |
| 2006/0140410 A1 | 6/2006 | Aihara | |
| 2006/0146752 A1 | 7/2006 | Jang et al. | |
| 2006/0233376 A1 | 10/2006 | Forsberg et al. | |
| 2006/0276190 A1 | 12/2006 | Shaheen | |
| 2007/0036109 A1 | 2/2007 | Kwak et al. | |
| 2007/0060127 A1 | 3/2007 | Forsberg | |
| 2007/0064647 A1 | 3/2007 | Prasad | |
| 2007/0173283 A1 | 7/2007 | Livet et al. | |
| 2007/0213060 A1 | 9/2007 | Shaheen | |
| 2007/0280175 A1 | 12/2007 | Cheng et al. | |
| 2007/0297367 A1 | 12/2007 | Wang et al. | |
| 2008/0101311 A1 | 5/2008 | Bernhard et al. | |
| 2008/0184032 A1 | 7/2008 | Li et al. | |
| 2008/0198822 A1* | 8/2008 | Magnusson et al. ......... | 370/338 |
| 2008/0233941 A1 | 9/2008 | Jen | |
| 2008/0233947 A1 | 9/2008 | Herrero-Veron | |
| 2009/0271623 A1* | 10/2009 | Forsberg ............... | H04W 12/04 713/168 |
| 2010/0190500 A1 | 7/2010 | Choi et al. | |
| 2010/0202618 A1* | 8/2010 | Yang ..................... | H04L 63/068 380/277 |
| 2011/0080875 A1* | 4/2011 | Yang ..................... | H04L 63/068 370/328 |
| 2011/0310849 A1* | 12/2011 | Yang ..................... | H04L 63/068 370/331 |
| 2012/0159151 A1* | 6/2012 | Janakiraman ......... | H04L 43/028 713/153 |
| 2012/0164979 A1* | 6/2012 | Bachmann ............ | H04L 63/164 455/411 |
| 2012/0224564 A1* | 9/2012 | Paisal ..................... | H04N 7/148 370/331 |
| 2012/0307803 A1* | 12/2012 | Yang ..................... | H04L 63/068 370/331 |
| 2013/0044709 A1* | 2/2013 | Adjakple ............ | H04W 76/025 370/329 |
| 2013/0195268 A1* | 8/2013 | Norrman ............... | H04W 12/04 380/247 |
| 2013/0269001 A1* | 10/2013 | Janakiraman ......... | H04L 43/028 726/4 |
| 2015/0208240 A1* | 7/2015 | Yang ..................... | H04L 63/068 726/6 |

FOREIGN PATENT DOCUMENTS

| | | |
|---|---|---|
| CN | 1481651 A | 3/2004 |
| CN | 1614930 A | 5/2005 |
| CN | 1937825 A | 3/2007 |
| CN | 101005489 A | 7/2007 |
| CN | 101022647 A | 8/2007 |
| CN | 101304600 A | 11/2008 |
| CN | 101309500 B | 11/2008 |
| EP | 1764933 A1 | 3/2007 |
| WO | WO 2006022469 A1 | 3/2006 |
| WO | WO 2006124347 A2 | 11/2006 |

OTHER PUBLICATIONS

1st Office Action in corresponding U.S. Appl. No. 12/617,175 (Feb. 13, 2013).
"3GPP TS 23.401—3rd Generation Partnership Project; Technical Specification group Services and System Aspects; 3GPP System Architecture Evolution: GPRS enhancements for E-UTRAN access (Release 8)," Version 0.4.1, 3rd Generation Partnership Project, Valbonne, France (Apr. 2007).
"3GPP TS 43.129—3rd Generation Partnership Project; Technical Specification Group GSM/EDGE Radio Access Network; Packet-switched handover for GERAN A/Gb mode; Stage 2 (Release 7)," Version 7.1.0, 3rd Generation Partnership Project, Valbonne, France (Feb. 2007).
"3GPP TSG SA WG3 Security—SA3#46b—Pseudo-Change Request to TR 33.821 v0.1.0: Update of section 7.4.13 on security algorithm negotiation in SAE/LTE," Agenda Item: SAE/LTE security, S3-070233, 3rd Generation Partnership Project, Valbonne, France (2007).
"ETSI TS 133 102—Universal Mobile Telecommunications System (UMTS); 3G security; Security architecture (3GPP TS 33.102 version 7.1.0 Release 7)," Version 7.1.0, European Telecommunications Standards Institute, Valbonne, France (Dec. 2006).
"3GPP TSG-SA2 Meeting #62—Selecting and signaling the security algorithms in handover from Rel-8 UTRAN to E-UTRAN," Change Request, S2-070939, 3rd Generation Partnership Project, Valbonne, France (Jan. 2007).
"3GPP TSG SA WG2 Architecture—S2#57 Rel-8—2G to LTE IRAT Handover," Agenda Item 8.3.1, S2-072160, 3rd Generation Partnership Project, Valbonne, France (Apr. 2007).
"3GPP TR 33.821—3rd Generation Partnership Project; Technical Specification Group Services and System Aspects; Rationale and track of security decisions in Long Term Evolved (LTE) RAN / 3GPP System Architecture Evolution (SAE) (Release 8)," Version 0.2.0, 3rd Generation Partnership Project, Valbonne, France (Apr. 2007).

(56) References Cited

OTHER PUBLICATIONS

Office Action in corresponding U.S. Appl. No. 14/667,099 (Jun. 30, 2015).
U.S. Appl. No. 12/617,175, filed Nov. 12, 2009.
Certified Priority Document PCT/EP2007/061223 corresponding to U.S. Appl. No. 60/852,967 (Mar. 10, 2008).
Certified Priority Document PCT/KR2007/004600 corresponding to Indian Patent Application No. 1800/CHE/2006 (Dec. 27, 2007).
"Updated version of 'Rationale and track of security decisions in Long Term Evolved RAN/3GPP System Architecture Evolution'," 3GPP TSG SA WG3 Security—SA3#44, Tallinn, Estonia, Draft S3-060564, $3^{rd}$ Generation Partnership Project, Valbonne, France (Jul. 11-14, 2006).
"Selecting and signaling the security algorithms in handover from Rel-8 UTRAN to E-UTRAN," 3GPP TSG-SA2 Meeting #62, Marina Del Ray, California, S2-080939, 3rd Generation Partnership Project, Valbonne, France (Jan. 14-18, 2007).
$2^{nd}$ Office Action in corresponding U.S. Appl. No. 14/667,099 (Jan. 29, 2016).
Office Action in corresponding U.S. Appl. No. 14/667,099 (Aug. 25, 2016).

\* cited by examiner

METHOD AND USER EQUIPMENT FOR NEGOTIATING SECURITY DURING HANDOVER BETWEEN DIFFERENT RADIO ACCESS TECHNOLOGIES

CROSS-REFERENCE TO RELATED APPLICATIONS

This application is a continuation of U.S. patent application Ser. No. 12/617,175, filed on Nov. 12, 2009, which is a continuation of International Patent Application No. PCT/CN2008/070962, filed May 14, 2008, which claims priority to Chinese Patent Application No. 200710099176.7, filed May 15, 2007, all of which are hereby incorporated by reference in their entireties.

FIELD OF THE INVENTION

The present invention relates to mobile communication, and in particular, to a method and apparatus for negotiating security during handover between different radio access technologies.

BACKGROUND

In a mobile communication system, a User Equipment (UE) generally needs to handover between base stations when moving from a local base station to a target base station. The Radio Access Networks (RANs) of base stations include: Second Generation (2G) system, Third Generation (3G) system, and the Long Term Evolution (LTE) system to be launched in the future. The security protection levels and protection measures between a UE and a RAN are different from those between the UE and another RAN.

FIG. 1 shows structure of two security-related layers in the LTE system. As shown in FIG. 1, the Xu interface, S1-C interface, S1-U interface, and X2 interface have security requirement. In an LTE system, the base station is in a locale vulnerable to attacks. Therefore, the base station is not as secure as the Radio Network Controller (RNC) in the Universal Mobile Telecommunications System (UMTS).

In the process of base station handover between the 2G system and the 3G system, the UE needs to negotiate the security parameters as regards only the access layer with the base station in the 2G system or 3G system. In the process of base station handover from the 2G or 3G system to the LTE system, more security information need to be negotiated between the UE and the LTE system, and a higher security level is also required. The UE needs to negotiate the security parameters as regards both the access layer and the non-access layer with the base station of the LTE system. Therefore, security is crucial for the base station handover from a 2G system or 3G system to an LTE system.

FIG. 2 is a flowchart of negotiating security between the UE and the 2G system or 3G system in the process of base station handover between the 2G system and the 3G system in the conventional art. The negotiation process includes the following steps:

Step 1: The source Base Station Subsystem (BSS) of the UE decides to initiate a handover request according to the measurement report of the UE.

Step 2: The source BSS sends the UE capability information (including the integrity protection algorithm and encryption algorithm supported by the UE) and the key information to the Serving GPRS Support Node (SGSN) of 2G system.

Step 3: The SGSN of 2G system sends the received UE capability information and the key information to the SGSN of 3G system.

Step 4: The SGSN of 3G system sends the received key information and the algorithm supported by the UE to a RNC.

Step 5: According to the received key information and the algorithm supported by the UE, the RNC selects the algorithm supported by the RNC and sends it to the SGSN of 3G system.

Step 6: The SGSN of 3G system sends the algorithm supported by the RNC to the SGSN of 2G system.

Afterward, at the time of sending a handover request acknowledgement to the source access network of the UE, the SGSN of 2G system sends the algorithm supported by the 3G SGSN to the source access network. At the time of sending a handover command to the UE, the source access network sends the algorithm to be used by the target system to the UE, thus completing security negotiation.

In the process of implementing the present invention, the inventor finds that the LTE system has two security-related strata: Non Access Stratum (NAS), and Access Stratum (AS). During handover between the 2G system and the 3G system, the security information handled at the SGSN side relates to the AS only, without relating to the NAS. Therefore, the foregoing process of negotiation between the UE and the 2G system or 3G system can not be applied to the UE handover from the 2G system or 3G system to the LTE system. That is, no handover solution is currently available to ensure secure handover of the base station from the 2G system or 3G system to the LTE system.

SUMMARY

The embodiments of the present invention are directed to providing a method and apparatus for negotiating security during handover between different radio access technologies. When the UE hands over from a different system to an LTE system, the UE obtains the security information of the NAS and AS selected by the LTE system, and performs security negotiation with the LTE system.

The objectives of the embodiments of the present invention are fulfilled through the following technical solution.

A method for negotiating security during handover between different radio access technologies includes: transmitting the security information of the NAS and security information of AS selected by the target system to the UE when the UE hands over between different radio access technologies, so that the UE can perform security negotiation with the target system according to the security information of the NAS and security information of AS.

An eNB device includes: (1) a key and algorithm information receiving unit, adapted to receive through a handover request the following sent by a target Mobile Management Entity (MME): parameters used in NAS key derivation and algorithm information, parameters used in a eNB key derivation, the eNB key and UE capability information; (2) an algorithm selecting and key deriving unit, adapted to select a supported Radio Resources Control (RRC) encryption algorithm of the eNB, an integrity protection algorithm of the eNB, and a User Plane (UP) encryption algorithm of the eNB according to information received by the key and algorithm information receiving unit, and derive an RRC encryption key and a UP encryption key; and (3) a transparent container incorporating unit, adapted to include the following in a transparent container: parameters used in NAS key derivation and algorithm information obtained by the key and algorithm information receiving unit, parameters used in eNB key derivation, and the RRC encryption key, the UP encryption key, the RRC encryption algorithm of the eNB, the integrity protection algorithm of the eNB, and the UP encryption algorithm of the eNB that are obtained by the algorithm selecting and key deriving unit.

An eNB device includes: (1) a key and algorithm information receiving unit, adapted to receive through a handover request the following sent by a target MME: a NAS container, an eNB key ($K_{eNB}$), and UE capability information; (2) an algorithm selecting and key deriving unit, adapted to select a RRC encryption algorithm of the eNB, an integrity protection algorithm of the eNB, and a UP encryption algorithm of the eNB according to the $K_{eNB}$ and the UE capability information received by the key and algorithm information receiving unit, and derive an RRC encryption key and a UP encryption key; and (3) a transparent container incorporating unit, adapted to include parameters used in the RRC encryption key derivation and UP encryption key derivation, the RRC encryption algorithm of the eNB, the integrity protection algorithm of the eNB, and the UP encryption algorithm of the eNB obtained by the algorithm selecting and key deriving unit in an RRC container, and include the RRC container and the NAS container in a transparent container.

A source access network device includes: (1) a NAS container receiving unit, adapted to receive an NAS container sent by a target MME; (2) a RRC container incorporating unit, adapted to receive an RRC container sent by the target MME; and (3) a transparent container incorporating unit, adapted to include the NAS container received by the NAS container receiving unit and the RRC container received by the RRC container incorporating unit in a transparent container.

A target MME includes: (1) an algorithm selecting and key deriving unit, adapted to derive a NAS key ($K_{NAS}$) and an eNB key ($K_{eNB}$) according to received key information used by a source system, and select a NAS algorithm; and send the $K_{eNB}$ and UE capability information to a target, eNB through a handover request; (2) an NAS container incorporating unit, adapted to include the NAS algorithm, and parameters used in $K_{NAS}$ derivation, and the parameters used in $K_{eNB}$ derivation in an NAS container; and (3) a transparent container incorporating unit, adapted to receive a RRC container sent by the target eNB; and include the RRC container and the NAS container in a transparent container.

A UE includes: (1) a unit adapted to receive a transparent container and obtain the NAS security information of and AS security information from the received transparent container; and (2) a unit adapted to perform security negotiation with the target system according to the contents in the transparent container.

The technical solution provided in the embodiments of the present invention reveals that in the embodiments of the present invention, the security information of the NAS and the security information AS is transmitted to the UE. Therefore, when the UE hands over to the LTE system, the UE obtains the security information of the NAS and the security information AS selected by the LTE system, performs security negotiation with the LTE system, and creates a security association between the UE and the LTE system.

DETAILED DESCRIPTION

A method and an apparatus for negotiating security during handover between different radio access technologies are provided in an embodiment of the present invention.

The UE handover between different radio access technologies herein includes the UE handover from a different system to an LTE system. The method and apparatus provided in the embodiments of the present invention are described below, supposing that the UE hands over from a UTRAN system to an LTE system.

In the embodiments of the present invention, when the UE hands over from the UTRAN system to the LTE system, the target MME generates NAS security information and sends the NAS security information to the target eNB. The target eNB also generates AS security information, and creates a transparent container according to the NAS security information and the AS security information.

Figure 1:
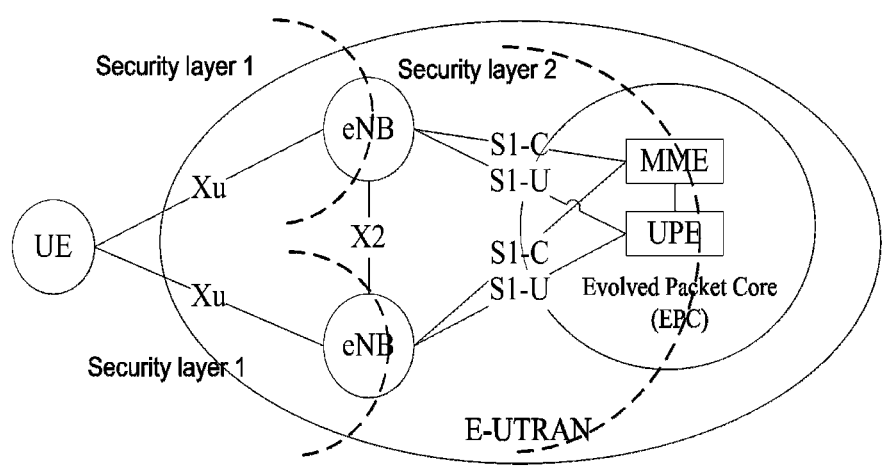
FIG. 1 shows structure of two security-related strata in the LTE system in the conventional art.
Figure 2:
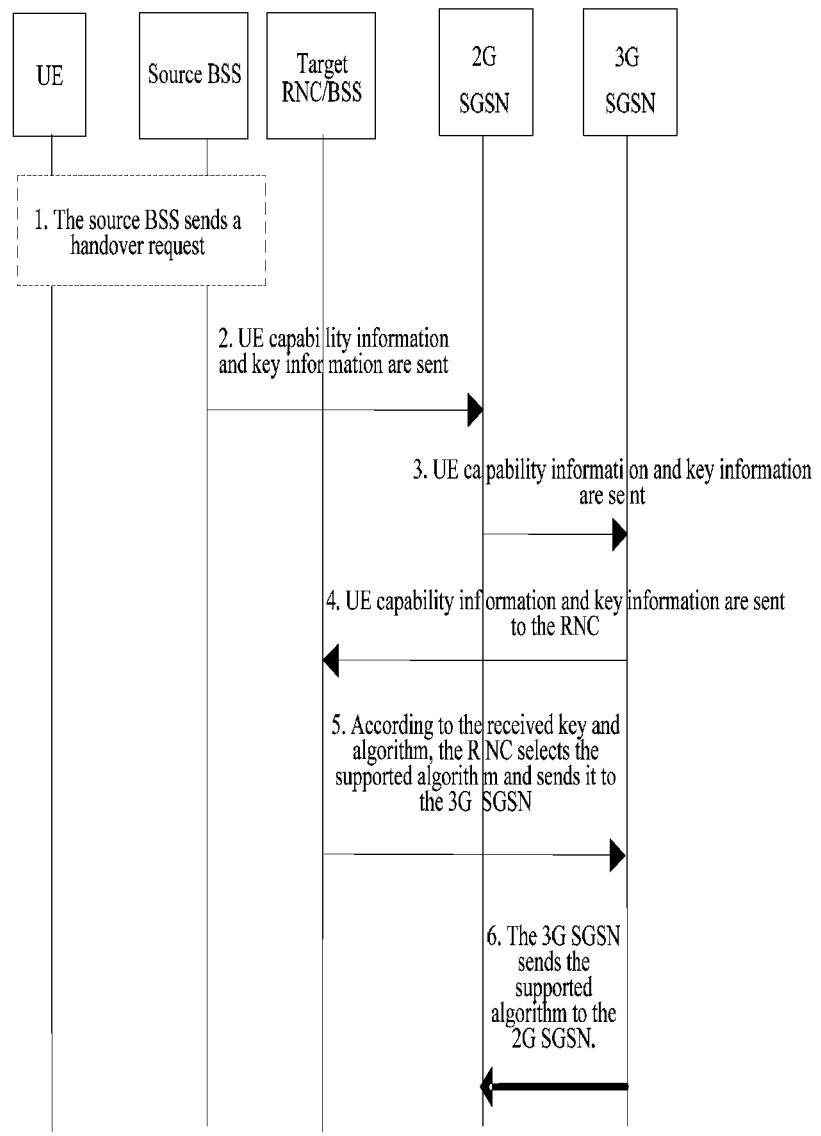
FIG. 2 is a flowchart of negotiation between the UE and the 2G system or 3G system in the process of base station handover between a 2G system and a 3G system in the conventional art.
Figure 3:
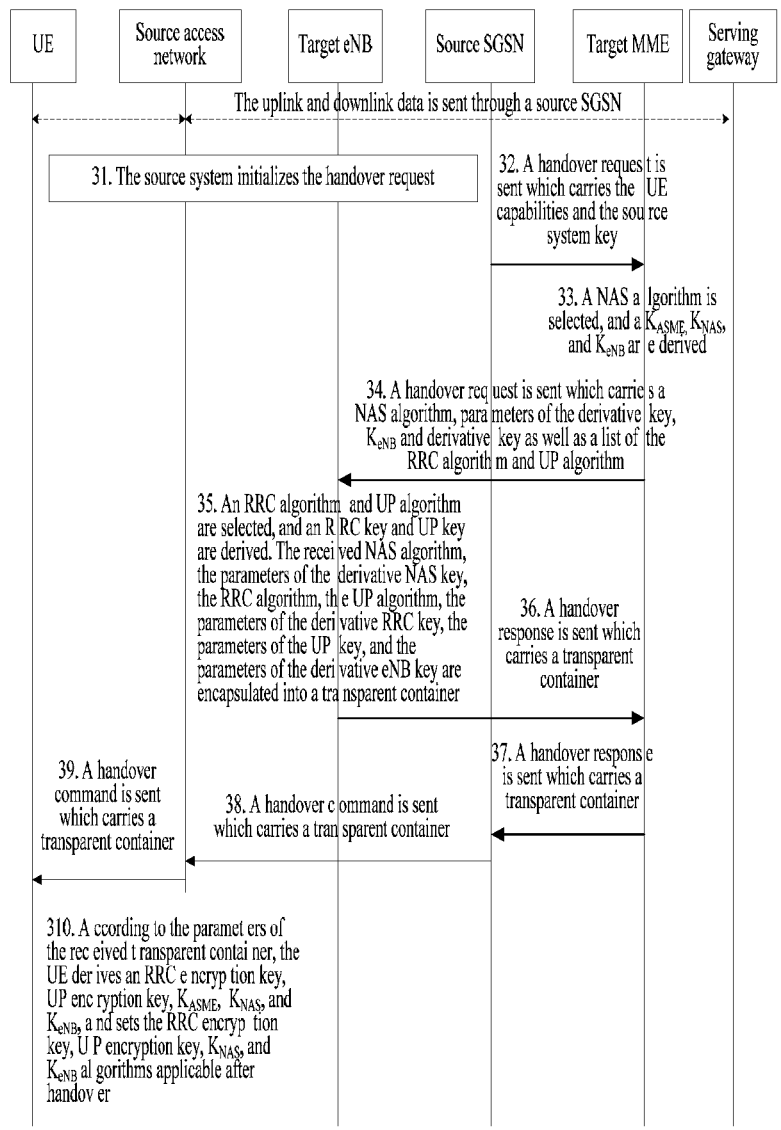
FIG. 3 is a flowchart of negotiation between a UE and an LTE system when the UE hands over from a UTRAN to an LTE system in the first embodiment of the present invention.

FIG. 3 is a flowchart of negotiating security between a UE and an LTE system when the UE hands over from a UTRAN to an LTE system in the first embodiment of the present invention. The negotiating process includes the following steps:

Step 31: First, the source system of the UE decides to perform a handover procedure, and initializes a handover request.

Step 32: The source SGSN sends the handover request to the target MME. The handover request includes the UE capability information (including a list of NAS algorithm of the UE, RRC algorithm of the UE, and UP algorithm of the UE) and the key information currently used by the source system (or the key derived by the source system according to the currently used key information).

Step 33: According to the received key information, the target MME derives an Access Security Management Entity (ASME) key $K_{ASME}$, an NAS key $K_{NAS}$, and an eNB key $K_{eNB}$, and selects an NAS algorithm.

Step 34: The target MME sends the parameters used in $K_{ASME}$ derivation, parameters used in $K_{NAS}$ derivation, parameters used in $K_{eNB}$ derivation, the $K_{eNB}$, the selected NAS algorithm, and the list of the RRC algorithm of the UE and UP algorithm of the UE to the target eNB through the handover request.

Step 35: The target eNB selects RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

The target eNB shall create a transparent container including: parameters used in the RRC encryption key derivation and the UP encryption key derivation; the received parameters used in $K_{ASME}$ derivation, parameters used in $K_{NAS}$ derivation, parameters used in $K_{eNB}$ derivation; the RRC algorithm of the UE and UP algorithm of the UE; the RRC encryption algorithm selected by the target eNB, integrity protection algorithm selected by the target eNB, and UP encryption algorithm selected by the target eNB.

Step 36: The target eNB sends the transparent container to the target MME.

Step 37: The target MME sends the transparent container to the source SGSN through a handover response.

Step 38: The source SGSN transmits the received transparent container to the source access network through a handover response.

Step 39: The source access network transmits the contents of the received transparent container to the UE through a handover command.

Step 310: According to the parameters used in the RRC encryption key derivation and the UP encryption key derivation, the parameters used in $K_{ASME}$ derivation, the parameters used in $K_{NAS}$ derivation, the parameters used in $K_{eNB}$ derivation in the received contents of the transparent container, the UE derives the RRC encryption key, UP encryption key, $K_{ASME}$, $K_{NAS}$, and $K_{eNB}$, and sets a protection algorithm applicable after handover.

Figure 4:
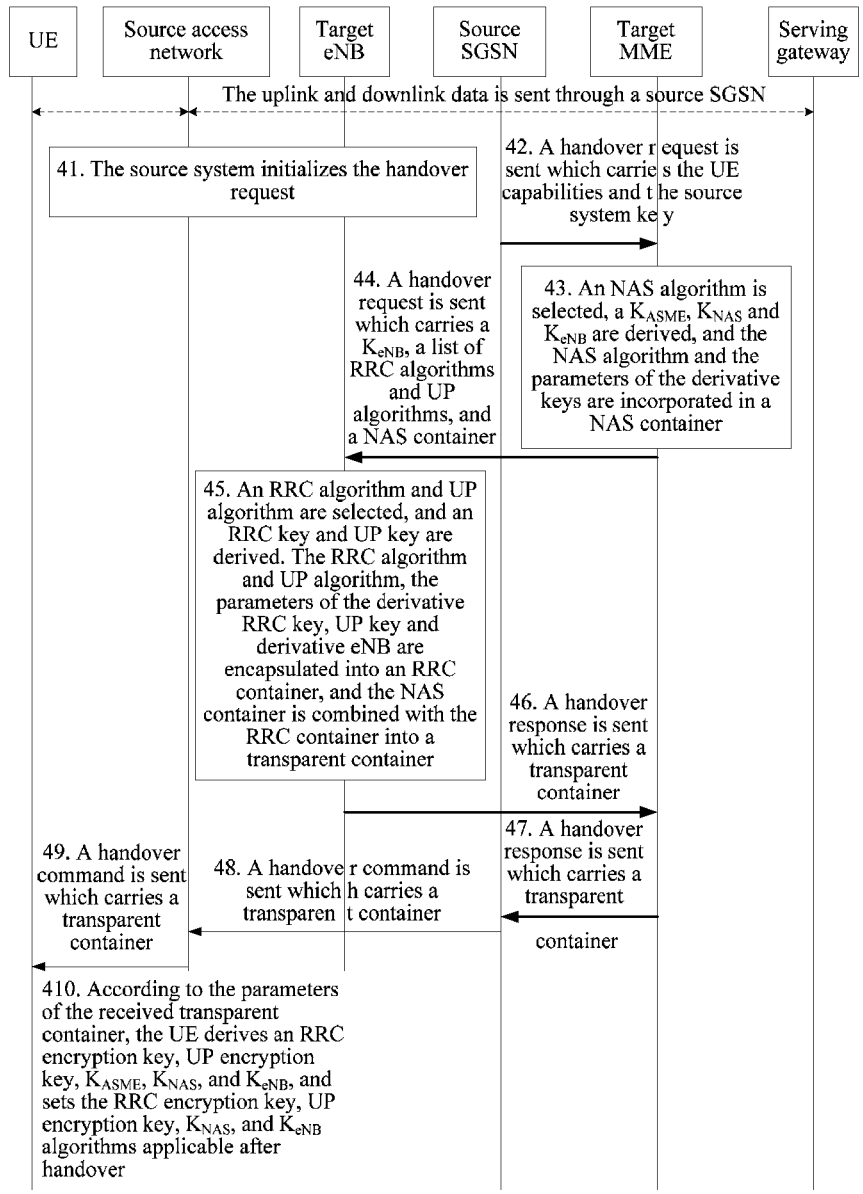
FIG. 4 is a flowchart of negotiation between a UE and an LTE system when the UE hands over from a UTRAN to an LTE system in the second embodiment of the present invention.

FIG. 4 is a flowchart of negotiating security between a UE and an LTE system when the UE hands over from a UTRAN to an LTE system in the second embodiment of the present invention. The negotiating process includes the following steps:

Step 41: First, the source system of the UE decides to perform a handover procedure, and initializes a handover request.

Step 42: The source SGSN sends the handover request to the target MME. The handover request includes the UE capability information (including a list of the NAS algorithm of the UE, RRC algorithm of the UE, and UP algorithm of the UE), and the key information currently used by the source system (or a processed key).

Step 43: According to the received key information, the target MME derives a $K_{ASME}$, a $K_{NAS}$, and a $K_{eNB}$, and selects an NAS algorithm. The target MME includes the selected NAS algorithm, parameters used in $K_{ASME}$ derivation, parameters used in $K_{NAS}$ derivation, and parameters used in $K_{eNB}$ derivation in an NAS container.

Step 44: The target MME sends the $K_{eNB}$, the list of RRC algorithm of the UE and UP algorithm of the UE, and the NAS container to the target eNB through the handover request.

Step 45: The target eNB selects the RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

The target eNB includes the following into an RRC container: parameters used in the RRC encryption key derivation and UP encryption key derivation; the RRC algorithm of the UE and UP algorithm of the UE; the RRC encryption algorithm selected by the target eNB, integrity protection algorithm selected by the target eNB, and the UP encryption algorithm selected by the target eNB. The RRC container and the received NAS container are included in a transparent container.

Step 46: The target eNB sends the transparent container to the target MME.

Step 47: The target MME sends the transparent container to the source SGSN through a handover response.

Step 48: The source SGSN transmits the received transparent container to the source access network through a handover command.

Step 49: The source access network transmits the contents of the received transparent container to the UE transparently through a handover command.

Step 410: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the received contents of the transparent container, the UE derives the corresponding RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the third embodiment of the present invention includes the following steps:

Step 51: First, the source system of the UE decides to perform a handover procedure, and initializes a handover request. Afterward, the source SGSN sends the handover request to the target MME. The handover request includes the UE capability information (including a list of the NAS algorithm of the UE, RRC algorithm of the UE, and UP algorithm of the UE), and the key information currently used by the source system (or a processed key).

Step 52: According to the received key information, the target MME derives a $K_{ASME}$, a $K_{NAS}$, and a $K_{eNB}$, and selects an NAS algorithm. The target MME includes the selected NAS algorithm, parameters used in $K_{ASME}$ derivation, parameters used in $K_{NAS}$ derivation, and parameters used in $K_{eNB}$ derivation in an NAS container. Afterward, the target MME sends the $K_{eNB}$, the list of RRC algorithm of the UE and UP algorithm of the UE, and the NAS container to the target eNB through the handover request.

Step 53: The target eNB selects RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

Afterward, the target eNB includes the following contents in a transparent container: parameters used in the RRC encryption key derivation and UP encryption key derivation; the RRC algorithm of the UE and UP algorithm of the UE; the RRC encryption algorithm selected by the target eNB, integrity protection algorithm selected by the target eNB, the UP encryption algorithm selected by the target eNB, and the received NAS container. Then, the target eNB sends the transparent container to the target MME.

Step 54: The target MME sends the transparent container to the source SGSN through a handover response. The source SGSN transmits the received transparent container to the source access network through a handover command. The source access network transmits the contents of the received transparent container to the UE through a handover command.

Step 55: According to the parameters used in the RRC encryption key derivation and UP encryption key derivation, the parameters used in $K_{ASME}$ derivation, the parameters used in $K_{NAS}$ derivation, and parameters used in $K_{eNB}$ derivation in the received contents of the transparent container, the UE derives the RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the fourth embodiment of the present invention includes the following steps:

Step 61: First, the source system of the UE decides to perform a handover procedure, and initializes a handover request. Afterward, the source SGSN sends the handover request to the target MME. The handover request includes the UE capability information (including a list of the RRC algorithm of the UE, and UP algorithm of the UE) and the key information currently used by the source system (or a processed key).

Step 62: According to the received key information, the target MME derives a $K_{ASME}$, a $K_{NAS}$, and a $K_{eNB}$, and selects an NAS algorithm.

Afterward, the target MME sends the list of the RRC algorithm of the UE and UP algorithm of the UE as well as the $K_{eNB}$ to the target eNB. The target MME includes the selected NAS algorithm, parameters used in $K_{ASME}$ derivation, parameters used in $K_{NAS}$ derivation, and parameters used in $K_{eNB}$ derivation in an NAS container, and sends the NAS container to the source access network through the source SGSN.

Step 63: The target eNB selects RRC encryption algorithm of the target eNB, integrity protection algorithm of the target eNB, and UP encryption algorithm of the target eNB; and derives an RRC encryption key, an integrity key, and a UP encryption key according to the received $K_{eNB}$.

The target eNB includes the following in an RRC container: parameters used in the RRC encryption key derivation and UP encryption key derivation; the RRC algorithm of the UE and UP algorithm of the UE; the RRC encryption algorithm selected by the target eNB and integrity protection algorithm selected by the target eNB, and the UP encryption algorithm selected by the target eNB. Then, the target eNB sends the contents of the RRC container to the target MME.

Step 64: The target MME sends the contents of the RRC container to the source SGSN through a handover response, and the source SGSN transmits the received RRC container to the source access network through a handover command.

The source access network sends the contents of the received NAS container and the contents of the RRC container to the UE.

Step 65: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the contents of the received NAS container and RRC container, the UE derives the corresponding RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the fifth embodiment of the present invention includes the following steps:

Step 71: First, the source system of the UE decides to perform a handover procedure, and initializes a handover request. Afterward, the source SGSN sends a handover request to the target MME. The handover request includes the UE capability information (including a list of the RRC algorithm of the UE, and UP algorithm of the UE), and the key information currently used by the source system (or a processed key).

Step 72: According to the received key information, the target MME derives a $K_{ASME}$, a $K_{NAS}$, and a $K_{eNB}$, and selects an NAS algorithm.

The target MME sends the UE capability information and $K_{eNB}$ to the target eNB, and includes parameters used in $K_{ASME}$ derivation, parameters used in $K_{NAS}$ derivation, and parameters used in $K_{eNB}$ derivation as well as the NAS algorithm in an NAS container.

Step 73: The target eNB selects RRC encryption algorithm of the target eNB, integrity protection algorithm of the target eNB, and UP encryption algorithm of the target eNB; and derives an RRC encryption key, an integrity key, and a UP encryption key according to the received $K_{eNB}$.

The target eNB includes parameters used in the RRC encryption key derivation and UP encryption key derivation, the RRC encryption algorithm of the target eNB, integrity protection algorithm of the target eNB and UP encryption algorithm of the target eNB in an RRC container, and sends the RRC container to the target MME. The target MME includes the RRC container and the NAS container in a transparent container, and sends the transparent container to the source access network through a source SGSN.

The source access network sends the contents of the received transparent container to the UE.

Step 74: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the contents of the received NAS container and RRC container, the UE derives the corresponding RRC encryption key, UP encryption key, $K_{ASME}$, $K_{NAS}$, and $K_{eNB}$, and sets the relevant algorithm applicable after handover.

The processes of the embodiment 1, embodiment 2, embodiment 3 and embodiment 4 suppose that the UE hands over from the UTRAN to the LTE system, and are also applicable to the scenario of handover from a 2G network to an LTE network, where both the 2G network and the 3G network are called a Packet Switched (PS) domain.

If the UE hands over from a Circuit Switched (CS) domain of the 2G/3G to an LTE system, the process of security negotiation between the UE and the LTE network needs to be decided according to the specific handover process of the UE.

When the UE hands over from the CS domain of the 2G/3G system to the LTE system, if the UE is disconnected from the CS domain of the 2G/3G system and then connected with the LTE system again, the UE may perform an Authentication and Key Agreement (AKA) process with the LTE system directly, and then obtain the corresponding NAS security information and AS security information from the LTE system.

When the UE hands over from the CS domain of the 2G/3G system to the LTE system, if the UE hands over from the CS domain of the 2G/3G system to the PS domain of the 2G/3G system and then hands over to the LTE system smoothly, the process of security association negotiated between the UE and LTE system is the same as that in the foregoing process of handover from the PS domain of the 2G/3G system to the LTE system.

When the UE hands over from the CS domain of the 2G/3G system to the LTE system, if the UE hands over from the CS domain of the 2G/3G system to the LTE system, the security association negotiated between the UE and the LTE system is transferred through a Mobile Services Switching Center (MSC) node and a target MME, thus facilitating the UE to obtain the corresponding NAS security information and AS security information.

When the UE hands over from the CS domain of the 2G/3G system to the LTE system, if the UE hands over from the IP Multimedia Subsystem (IMS) on the CS domain of the 2G/3G system to the LTE system first, the security association negotiated between the UE and the LTE system is transferred through a Call Session Control Function (CSCF) node of the IMS and a target MME, thus facilitating the UE to obtain the corresponding NAS security information and AS security information.

Figure 5:
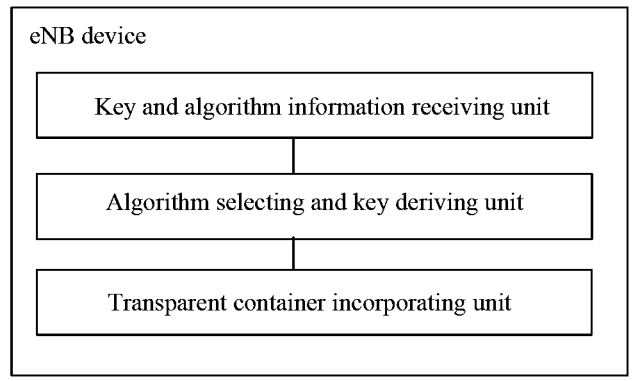
FIG. 5 shows structure of an eNB device provided in an embodiment of the present invention.

As shown in FIG. 5, an eNB device provided in an embodiment of the present invention includes: (1) a key and algorithm information receiving unit, adapted to receive through a handover request the following sent by a target Mobile Management Entity (MME): parameters used in Non Access Stratum (NAS) key derivation and algorithm information, parameters used in a eNB key derivation, the eNB key and User Equipment (UE) capability information; (2) an algorithm selecting and key deriving unit, adapted to select RRC encryption algorithm of the eNB, integrity protection algorithm of the eNB, and UP encryption algorithm of the eNB according to the information received by the key and algorithm information receiving unit, and derive an RRC encryption key and a UP encryption key; and (3) a transparent container incorporating unit, adapted to includes the following in a transparent container: the parameter and algorithm information of the NAS key and the parameter and algorithm information of the AS key obtained by the key and algorithm information receiving unit; and the RRC encryption key, UP encryption key, RRC encryption algorithm of the eNB, integrity protection algorithm of the eNB, and UP encryption algorithm of the eNB that are obtained by the algorithm selecting and key deriving unit.

An eNB device is provided in an embodiment of the present invention. As shown in FIG. 5, the eNB device includes: (1) a key and algorithm information receiving unit, adapted to receive through a handover request the following sent by a target Mobile Management Entity (MME): a Non Access Stratum (NAS) container, an eNB key ($K_{eNB}$), and User Equipment (UE) capability information sent; (2) an algorithm selecting and key deriving unit, adapted to select RRC encryption algorithm of the eNB, integrity protection algorithm of the eNB, and UP encryption algorithm of the eNB according to the $K_{eNB}$ and UE capability information received by the key and algorithm information receiving unit, and derive an RRC encryption key and a UP encryption key; and (3) a transparent container incorporating unit, adapted to include parameters used in the RRC encryption key derivation and UP encryption key derivation, RRC encryption algorithm of the eNB, integrity protection algorithm of the eNB, and UP encryption algorithm of the eNB obtained by the algorithm selecting and key deriving unit in an RRC container; and include the RRC container and the NAS container in a transparent container.

Figure 6:
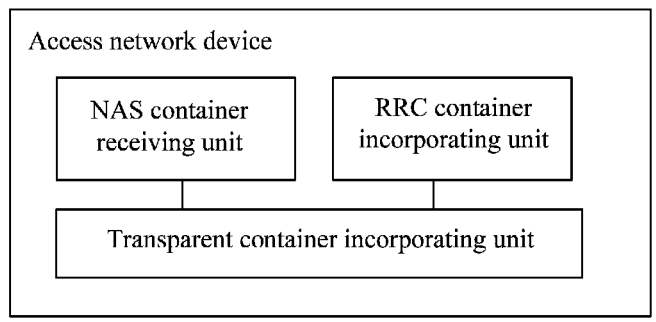
FIG. 6 shows structure of an access network device provided in an embodiment of the present invention.

A source access network device is provided in an embodiment of the present invention. As shown in FIG. 6, the source access network device includes: (1) an NAS container receiving unit, adapted to receive an NAS container sent by the target MME; (2) an RRC container incorporating unit, adapted to receive an RRC container sent by the target MME; and (3) a transparent container incorporating unit, adapted to include the NAS container received by the NAS container receiving unit and the RRC container received by the RRC container incorporating unit in a transparent container.

Figure 7:
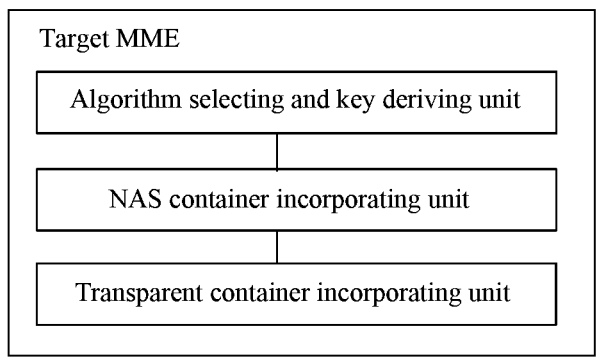
FIG. 7 shows structure of a target MME provided in an embodiment of the present invention and FIG. 8 is an embodiment of a UE device.
Figure 8:
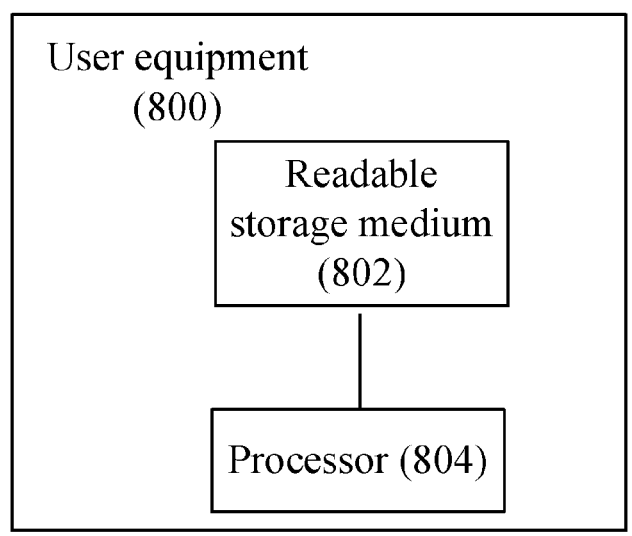

A target MME is provided in an embodiment of the present invention. As shown in FIG. 7, the target MME includes: (1) an algorithm selecting and key deriving unit, adapted to derive a $K_{NAS}$ and a $K_{eNB}$ according to the received key information used by the source system, and select an NAS algorithm; and send the $K_{eNB}$ and UE capability information to the target eNB through a handover request; (2) an NAS container incorporating unit, adapted to include the NAS algorithm, and the parameters used in $K_{NAS}$ derivation, and the parameters used in $K_{eNB}$ derivation in an NAS container; and (3) a transparent container incorporating unit, adapted to receive the RRC container sent by the target eNB, and include the RRC container and the NAS container in a transparent container.

To sum up, in the embodiments of the present invention, the security information of the NAS and AS is transmitted to the UE 800. Therefore, when the UE hands over from a 3G or 2G system, such as Universal Terrestrial Radio Access Network (UTRAN), to the LTE system, the UE obtains the security information of the NAS and AS selected by the LTE system, performs security negotiation with the LTE system, and creates a security correlation between the UE and the LTE system.

Furthermore, a transparent container may be generated out of the security information of the NAS and AS selected by the LTE system, the capability information supported by the UE, and the encryption algorithm selected by the target eNB, and the transparent container is transmitted to the UE. Therefore, when the UE hands over from the UTRAN to the LTE system, the UE obtains the parameter information of the NAS key and AS key selected by the LTE system, and the encryption algorithm selected by the target eNB. The UE negotiates the NAS and AS security parameters and the security algorithm between the LTE system and a different system without adding any signaling, and a security correlation is created between the UE and the LTE system.

The embodiments of the present invention are compatible with the handover signaling flow between the 2G system and the 3G system, and implement negotiation of the NAS and AS security parameters and the security algorithm between the LTE system and a different system without adding any extra signaling.

It is understandable to those skilled in the art that the processes in the foregoing embodiments may be implemented by hardware executed by a processor 802 instructed by a program. The program may be stored in a readable storage medium 804. Once being executed, the program performs the steps covered by the foregoing methods. The storage medium may be a ROM/RAM, magnetic disk or compact disk.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A communication method in a handover from a source system supporting a first radio access technology to a target system supporting a second radio access technology different from the first radio access technology, comprising:
   receiving, by a user equipment, a transparent container from the source system, wherein the transparent container including algorithm information of a non access stratum (NAS) and algorithm information of an access stratum (AS) which are selected by the target system; and
   deriving, by the user equipment, NAS keys according to the algorithm information of the NAS;

deriving, by the user equipment, radio resource control (RRC) and user plane (UP) keys according to the algorithm information of the AS; and handing over, by the user equipment, from the source system to the target system by using the NAS keys and the RRC and UP keys.

2. The method according to claim 1, wherein the transparent container further includes a parameter used in a derivation of an access security management entity key;

wherein the deriving of the NAS keys comprises deriving, by the user equipment, the NAS keys according to the algorithm information of the NAS and the parameter used in a derivation of an access security management entity key; and wherein deriving the RRC and the UP keys comprises deriving, by the user equipment, the RRC and the UP keys according to the algorithm information of the AS and the parameter used in a derivation of an access security management entity key.

3. The method according to claim 1, wherein handing over, by the user equipment, from the source system to the target system comprises:

handing over, by the user equipment, from a second generation system to a long term evolution system.

4. The method according to claim 1, wherein handing over, by the user equipment, from the source system to the target system comprises:

handing over, by the user equipment, from a third generation system to a long term evolution system.

5. A user equipment, comprising:

a computer readable storage medium retaining instructions to:

receive a transparent container from a source system supporting a first radio access technology, wherein the transparent container including algorithm information of a non access stratum (NAS) and algorithm information of an access stratum (AS) which are selected by a target system supporting a second radio access technology different from the first radio access technology;

derive NAS keys according to the algorithm information of the NAS;

derive, by the user equipment, radio resource control (RRC) and user plane (UP) keys according to the algorithm information of the AS; and hand over, by the user equipment, from the source system to the target system by the NAS keys and the RRC and UP keys; and a processor, coupled to the computer readable storage medium, configured to execute the instructions retained in the computer readable storage medium to engage in a handover from the source system to the target system.

6. The user equipment according to claim 5, wherein the transparent container further includes a parameter used in a derivation of an access security management entity key;

wherein the instructions further related to:

deriving the NAS keys according to the algorithm information of the NAS and the parameter used in a derivation of an access security management entity key; and deriving according to the algorithm information of the AS and the parameter used in a derivation of an access security management entity key.

7. The user equipment according to claim 5, wherein the instructions further related to:

handing over from a second generation system to a long term evolution.

8. The user equipment according to claim 5, wherein the instructions further related to:

handing over from a third generation system to a long term evolution.

* * * * *